United States Patent [19]

Kreitzer

[11] Patent Number: 5,127,186
[45] Date of Patent: Jul. 7, 1992

[54] ENCAPSULATED EARTHWORM COCOONS

[75] Inventor: William R. Kreitzer, Gibson City, Ill.

[73] Assignee: Advanced Biotechnology, Inc., Gibson City, Ill.

[21] Appl. No.: 733,356

[22] Filed: Jul. 19, 1991

Related U.S. Application Data

[63] Continuation of Ser. No. 547,604, Jul. 2, 1990, abandoned.

[51] Int. Cl.⁵ .............. A01C 1/06; A01C 21/00; A01G 5/06; A01N 1/00
[52] U.S. Cl. .............. 47/57.6; 47/58; 47/DIG. 9; 71/64.02; 71/64.07; 71/64.09; 111/200; 111/900; 111/915; 111/916; 111/917; 427/4
[58] Field of Search .............. 47/56, 58, 57.6, DIG. 9; 427/4; 264/4.3, 4.7; 111/200, 900, 915, 916, 917; 71/64.02, 64.07, 64.09; 106/205; 435/177-180, 182, 260; 119/6.6, 6.7, 6.5

[56] References Cited

U.S. PATENT DOCUMENTS

| | | | |
|---|---|---|---|
| 3,734,987 | 5/1973 | Hamrin | 47/57.6 |
| 3,973,355 | 8/1976 | McKenzie | 47/57.6 |
| 4,249,343 | 2/1981 | Dannelly | 47/57.6 |
| 4,434,231 | 2/1984 | Jung | 47/57.6 |
| 4,513,685 | 4/1985 | Frijters | 119/1 |
| 4,551,165 | 11/1985 | Warner | 71/24 |
| 4,562,663 | 1/1986 | Redenbaugh | 47/57.6 |
| 4,583,320 | 4/1986 | Redenbaugh | 47/57.6 |
| 4,615,883 | 10/1986 | Nelsen | 424/84 |
| 4,701,326 | 10/1987 | Nelsen | 424/408 |
| 4,753,799 | 6/1988 | Nelsen | 424/408 |
| 4,755,468 | 7/1988 | Jung et al. | 47/57.6 |
| 4,759,151 | 7/1988 | Gerber | 47/57.6 |
| 4,765,275 | 8/1988 | Yukawa | 119/15 |
| 4,780,987 | 11/1988 | Nelsen | 47/57.6 |
| 4,808,430 | 2/1989 | Kouno | 427/4 |

FOREIGN PATENT DOCUMENTS

| | | | |
|---|---|---|---|
| 1040451 | 10/1978 | Canada | 47/57.6 |
| 0141373 | 5/1985 | European Pat. Off. | 47/57.6 |
| 0141374 | 5/1985 | European Pat. Off. | 47/57.6 |

*Primary Examiner*—Howard J. Locker
*Attorney, Agent, or Firm*—Philip L. Bateman

[57] ABSTRACT

Gel capsules having a size approximately equal to that of the seed being planted and which contain: (a) an earthworm cocoon having one or more viable eggs; and (b) a material to provide a density to the capsules approximately equal to that of the seed being planted; are mixed with and planted with the seed to introduce earthworms to a field.

11 Claims, No Drawings the field is planted.

ENCAPSULATED EARTHWORM COCOONS

CROSS-REFERENCE TO RELATED APPLICATION

This application is a continuation of U.S. patent application Ser. No. 07/547,604, filed Jul. 2, 1990, now abandoned.

FIELD OF THE INVENTION

This invention relates to a composition for, and a method of, introducing earthworms into a field at the same time the field is planted.

BACKGROUND OF THE INVENTION

The beneficial effect of earthworms in the soil on the growth of crops is well documented. Earthworm burrows improve the soil's water intake and help aerate and loosen the soil. Earthworms also improve the nutrient supply to the crops by ingesting organic material from the surface and excreting the digested material into the topsoil. In fact, Charles Darwin, the father of the theory of evolution, studied the earthworm extensively and wrote:

When we behold a wide, turf-covered expanse, we should remember that its smoothness, on which so much of its beauty depends, is mainly due to all the inequalities having been slowly leveled by worms. It may be doubted if there are any other animals which have played so important a part in the history of the world as have these lowly creatures.

See also H. Hopp and C. Slater, "The Effect of Earthworms on the Productivity of Agricultural Soil", *United States Department of Agriculture Journal of Agricultural Research*, Vol. 78, May 15, 1949.

Unfortunately, the farming techniques of the last several decades have destroyed the earthworm population in many fields. Most destructive of these techniques is the practice of tilling the fields after harvest in the autumn, leaving little debris covering the soil during the winter. The lack of ground cover reduces the earthworm's food supply and also affects soil temperature. On ground protected by sod or crop residue, the soil temperature drops slowly in the autumn, enabling the earthworms to retreat and hibernate below the frost line. But on bare land, the soil can freeze relatively suddenly after only a day or two of cold temperatures. Sudden exposure to frozen conditions, as often happens with bare land, is often fatal to earthworms.

Within the past several years, there has been a strong movement to reduce or eliminate tillage of the soil after harvest. Commonly known as "no-till", this technique is adopted primarily as a means to reduce soil erosion. An added benefit of no-till farming is that it recreates conditions favorable to the growth of earthworms. But even though conditions are again favorable, earthworms may have to be introduced into the soil in areas where the earthworm population has completely disappeared.

Adult earthworms, as any fisherman knows, can be harvested, transported, and preserved for several days in cool, moist conditions. For example, methods of raising and harvesting earthworms are disclosed in Frijters, U.S. Pat. No. 4,513,685, issued Apr. 30, 1985. However, it is not practical to use adult earthworms to repopulate a field. Adult earthworms are relatively expensive and cannot be shipped economically because of the weight of the medium required to enable the worms to survive for several days. Accordingly, a need exists for a practical means of introducing earthworms into a field.

The encapsulation of nematodes in hydrogel matrixes has been disclosed in Nelsen, U.S. Pat. No. 4,615,883, issued Oct. 7, 1986; Nelsen, U.S. Pat. No. 4,701,326, issued Oct. 20, 1987; Nelsen, U.S. Pat. No. 4,753,799, issued Jun. 28, 1988; and Yukawa, U.S. Pat. No. 4,765,275, issued Aug. 23, 1988.

The encapsulation of seeds with various additives has been disclosed in Warner, U.S. Pat. No. 4,551,165, issued Nov. 5, 1985; Gerber, U.S. Pat. No. 4,759,151, issued Jul. 26, 1988; and Nelsen, U.S. Pat. No. 4,780,987, issued Nov. 1988.

SUMMARY OF THE INVENTION

The objects of this invention are to provide an improved composition for, and an improved method of, introducing earthworms into a field. More particular objects are to provide such a composition and a method for introducing earthworms into a field at the same time the field is planted in corn, soybean, or other seed.

I have discovered a composition for introducing earthworms to a field at the same time the field is planted. The composition comprises gel capsules having a size approximately equal to that of the seed being planted and which contain: (a) an earthworm cocoon having one or more viable eggs; and (b) a material to provide a density to the capsule approximately equal to that of the seed being planted; such that the capsules may be mixed with and planted with the seed in a field.

I have also discovered a method of introducing earthworms to a field at the same time the field is planted. The method comprises: (a) obtaining gel capsules having a size approximately equal to that of the seed being planted and which contain: (i) an earthworm cocoon having one or more viable eggs; and (ii) a material to provide a density to the capsules approximately equal to that of the seed being planted; (b) mixing the capsules with the seed to be planted; and (c) planting the mixture of capsules and seeds in the same manner as the seeds are customarily planted, such that earthworm cocoons are introduced into the soil where the eggs hatch.

The method and composition of this invention enable earthworms to be introduced into a field efficiently, inexpensively, and quickly.

DETAILED DESCRIPTION OF THE INVENTION

A. Capsule

The composition of this invention comprises encapsulated earthworm cocoons. The cocoons are encapsulated for two reasons. First, the encapsulation provides a protective physical barrier for the fragile cocoons from the time of encapsulation until they are placed in the soil. The second reason for encapsulation is to permit the size and weight of a given seed to be matched so that the capsules can be easily mixed and planted with the seed. The cocoons alone are smaller and lighter in weight than most of the common seed crops.

The capsule is formed of a gel-type material which dissolves in water to enable the cocoon to be liberated in the soil. The material is also gas permeable to permit the flow of oxygen and carbon dioxide necessary for respiration of the eggs. One type of suitable capsule is formed by dipping the cocoons in a gel solution which then hardens around the cocoon. This method is known in the art and is described in Nelsen, U.S. Pat. No.

4,780,987, issued Nov. 1, 1988, the disclosure of which is herein incorporated by reference. A second, and preferred, type of capsule is a gel capsule of the type widely used for pharmaceuticals. This capsule has a length of about 5 to 20 mm and a diameter of about 2 to 10 mm in its cylindrical portion. The capsule is formed of two parts which telescope together. A preferred feature present in some capsules is a mechanical lock which is actuated when the two parts are fully telescoped together. A pharmaceutical-type capsule has a size similar to that of a seed of corn or soybean. When an earthworm cocoon and a dense material are added as described below, the capsules are conveniently planted along with corn or soybean in commercial farm planters.

B. Earthworm Cocoon

Earthworms reproduce by laying a cocoon. The number of eggs (ova) inside the cocoon vary. It has been reported that the cocoons of *Eisensia foetida* typically contain 10 to 60 ova, but that no more than 10 to 12 develop into embryos. Other species of earthworm have only 1 to 3 ova per cocoon. The incubation time from laying of a cocoon to hatching of an earthworm embryo also varies widely. Under ideal conditions of temperature and moisture, the incubation time for some species can be as short as one month or less. When stored in dry conditions, the eggs can remain viable for over one year.

Earthworm cocoons are harvested in a variety of ways, several of which are described in Frijters, U.S. Pat. No. 4,513,685, issued Apr. 30, 1985.

The term "earthworm" includes over 3,000 species of earthworms in the world. The more common species in the U.S.A. include *Lumbricus terrestris*, the night crawler; *Allolobophora caliginosa*, the common field worm; *Diplocardia verrucosa; Allolobophora chlorotica*, the green worm (also known as the pasture worm); *Eisenia foetida*, the manure worm; and *Lumbricus rubellus*, the red worm.

C. Dense Material

Commercial farm planters use gravity alone or a combination of airflow and gravity to move the seeds from the planter bins to the soil. Without the proper density, the encapsulated cocoons do not pass through the planter in the same manner as the seeds, resulting in uneven distribution of the cocoons in the field. Accordingly, it is important that the encapsulated cocoons have a density approximately equal to that of the seed being planted. If the capsule is formed by dipping in a gel solution, the solid coating of gel may provide sufficient density. If, on the other hand, a pharmaceutical-type capsule is used, it is generally necessary to add a dense material along with the cocoon inside the capsule.

The dense material may be a single material or a plurality of materials and may be inert or active. Examples of active materials are seeds, pesticides, fertilizers, energy sources, growth promoters, growth regulators, and microorganisms. Such materials are listed in Nelsen, U.S. Pat. No. 4,780,987, issued Nov. 1, 1988. Examples of inert materials include propylene glycol, sodium alginate, guar gum, and the various gel agents listed in Nelsen. Such materials serve the additional function of protecting the cocoon.

D. Method of Introduction to a Field

The composition of this invention can be placed in a field in a number of different ways. The composition can be added by itself using a tractor-pulled planter or it can be applied aerially and incorporated by disking. However, the preferred method of introduction of the composition is by mixture and planting with the seed being grown. Not only is this the least expensive method, but it occurs at a time of year well-suited for hatching of the eggs and growth of the infant worms.

The concentration at which to introduce the composition is a matter of choice. A number of factors are considered in choosing the concentration, including cost, current earthworm population in the field, and desired earthworm population in field. In general, the composition is introduced at the rate of about one cocoon per hundred square feet, or about 435 cocoons per acre.

I claim:

1. A composition for introducing earthworms to a field at the same time the field is planted, the composition comprising:
   (a) a crop seed; and
   (b) gel capsules having an external size approximately equal to the crop seed and containing an earthworm cocoon having one or more viable eggs and a material to provide a density to the capsules approximately equal to that of the crop seed.

2. The composition of claim 1 wherein the crop seed is corn or soybean.

3. The composition of claim 1 wherein the gel capsules are of the type having two parts which telescope together to form a shape having a cylindrical portion with hemispheres on each end.

4. The composition of claim 1 wherein the density-providing material is selected from the group consisting of seeds, pesticides, fertilizers, energy sources, growth promoters, growth regulators, and microorganisms.

5. The composition of claim 1 wherein the density-providing material comprises a gel agent.

6. A method of introducing earthworms to a field at the same time the field is planted, the method comprising obtaining and planting a composition comprising:
   (a) a crop seed; and
   (b) gel capsules having an external size approximately equal to the crop seed and containing an earthworm cocoon having one or more viable eggs and a material to provide a density to the capsules approximately equal to that of the crop seed.

7. The method of claim 6 wherein the crop seed is corn or soybean.

8. The method of claim 6 wherein the gel capsules are of the type having two parts which telescope together to form a shape having a cylindrical portion with hemispheres on each end.

9. The method of claim 6 wherein the density-providing material is selected from the group consisting of seeds, pesticides, fertilizers, energy sources, growth promoters, growth regulators, and microorganism.

10. The method of claim 6 wherein the density-providing material comprises a gel agent.

11. The method of claim 6 wherein the seed-capsule composition is planted with a commercial farm planter of the type containing a plurality of planter bins and which uses gravity alone or a combination of airflow and gravity to move the composition from the planter bins to the soil.

* * * * *